United States Patent [19]
Lovett

[11] 3,750,233
[45] Aug. 7, 1973

[54] SHRIMP SEPARATING METHODS

[76] Inventor: Jack R. Lovett, 1900 Irving St., Orange, Tex. 77630

[22] Filed: June 19, 1969

[21] Appl. No.: 834,652

[52] U.S. Cl. ............................. 17/45, 17/71, 209/3, 209/162, 209/173
[51] Int. Cl. ............................................. A22c 29/00
[58] Field of Search ..................... 17/45, 53, 71, 72, 17/73; 209/3, 162, 173

[56] References Cited
UNITED STATES PATENTS

| 719,948 | 2/1903 | Merriam | 209/173 |
| 2,888,709 | 6/1959 | Lapeyre | 17/71 |
| 2,991,882 | 7/1961 | Duplantis et al. | 17/53 X |
| 3,020,583 | 2/1962 | Lapeyre et al. | 17/71 |

Primary Examiner—Lucie H. Laudenslager
Attorney—Pravel, Wilson & Matthews

[57] ABSTRACT

After a net load of shrimp and fish is pulled aboard a shrimp boat the intermingled shrimp and fish are subjected to an electric shock for purposes of electrocuting same. The catch is then dumped into a flotation tank forming part of a sorting machine located on the shrimp boat. The lower portion of the flotation tank is filled with water and the shocked shrimp sink to the bottom of the tank, while the shocked fish float to the surface of the water therein. In sinking to the bottom, the shrimp fall through an inclined screening tray and onto a conveyor which removes them from the tank. After the shrimp have had time to settle to the bottom, the lower portion of the screening tray is elevated for purposes of dumping the larger fish onto a conveyor which carries them to a fish meal machine. A continuous flow of water is supplied to the tank and this serves to flow the smaller fish out of an outlet at the rear of the tank, from whence they are dumped back into the sea or into the fish meal machine.

7 Claims, 8 Drawing Figures

PATENTED AUG 7 1973

Jack R. Lovett
INVENTOR

BY B. R. Pravel
Horace C. Wilson, Jr.
Guy E. Matthews
ATTORNEYS

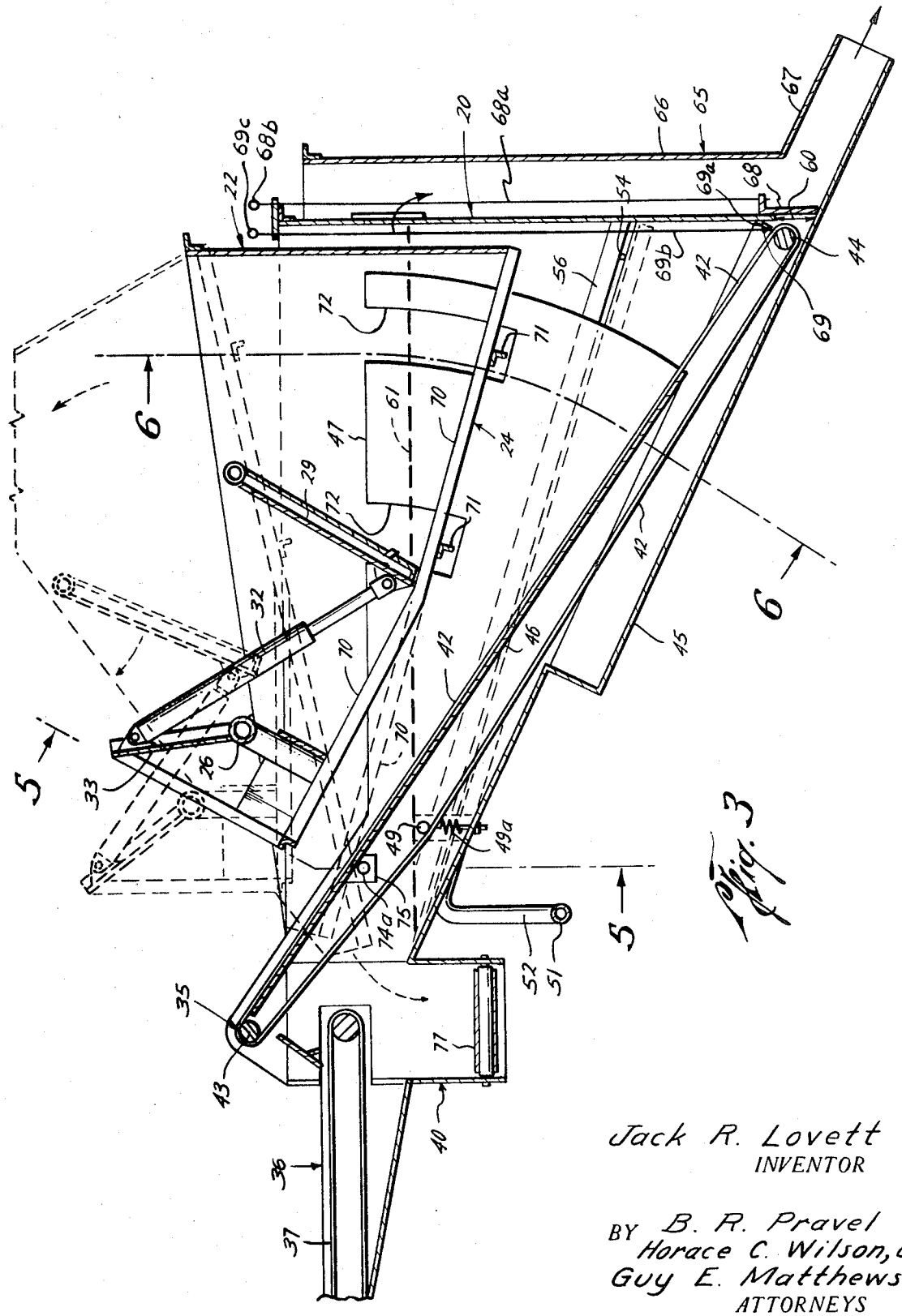

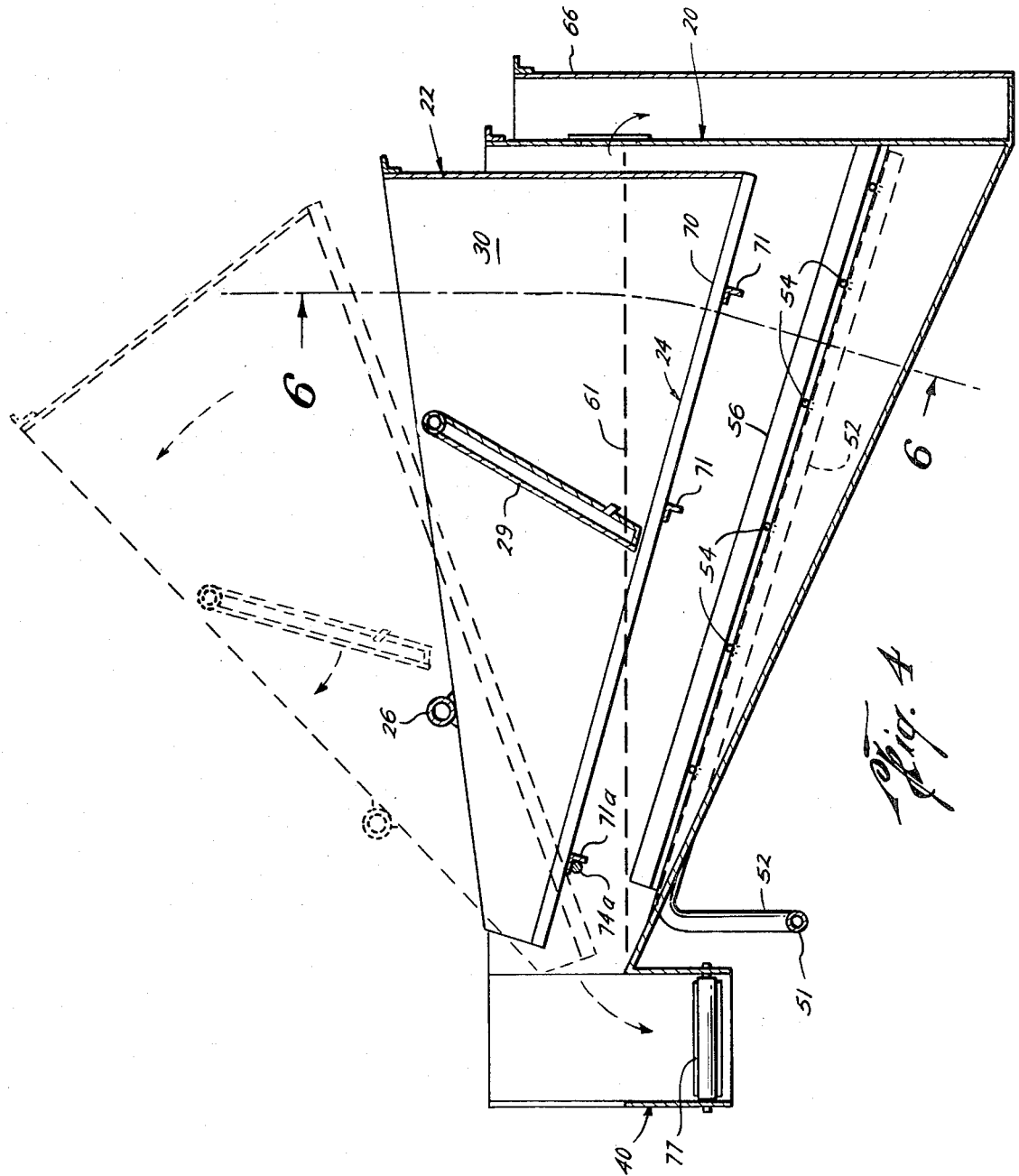

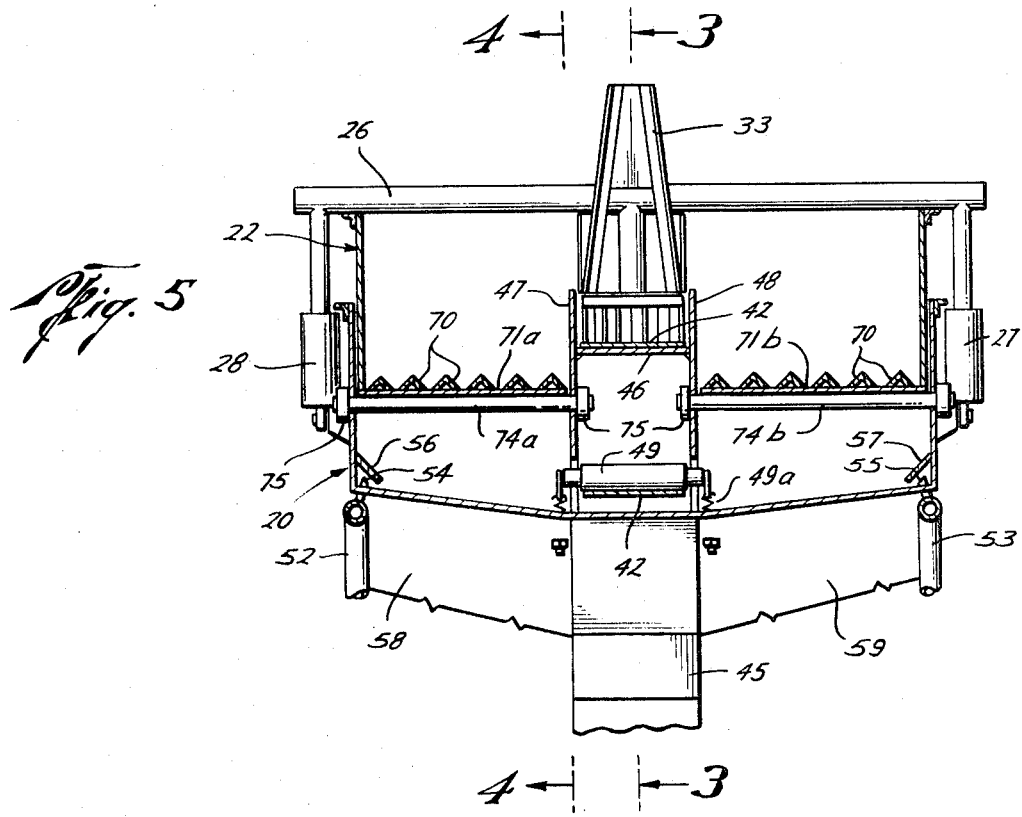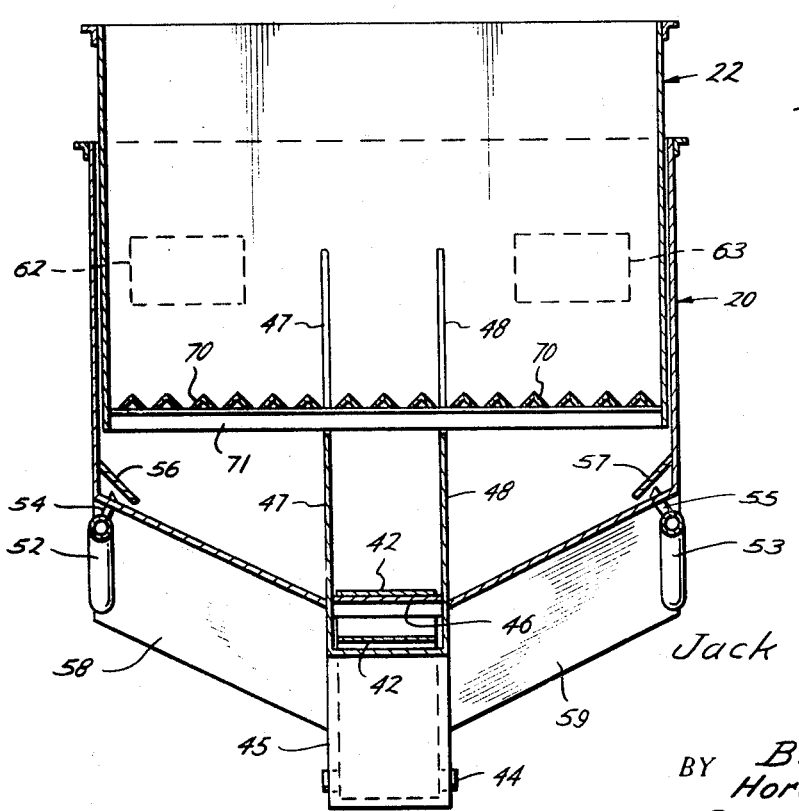

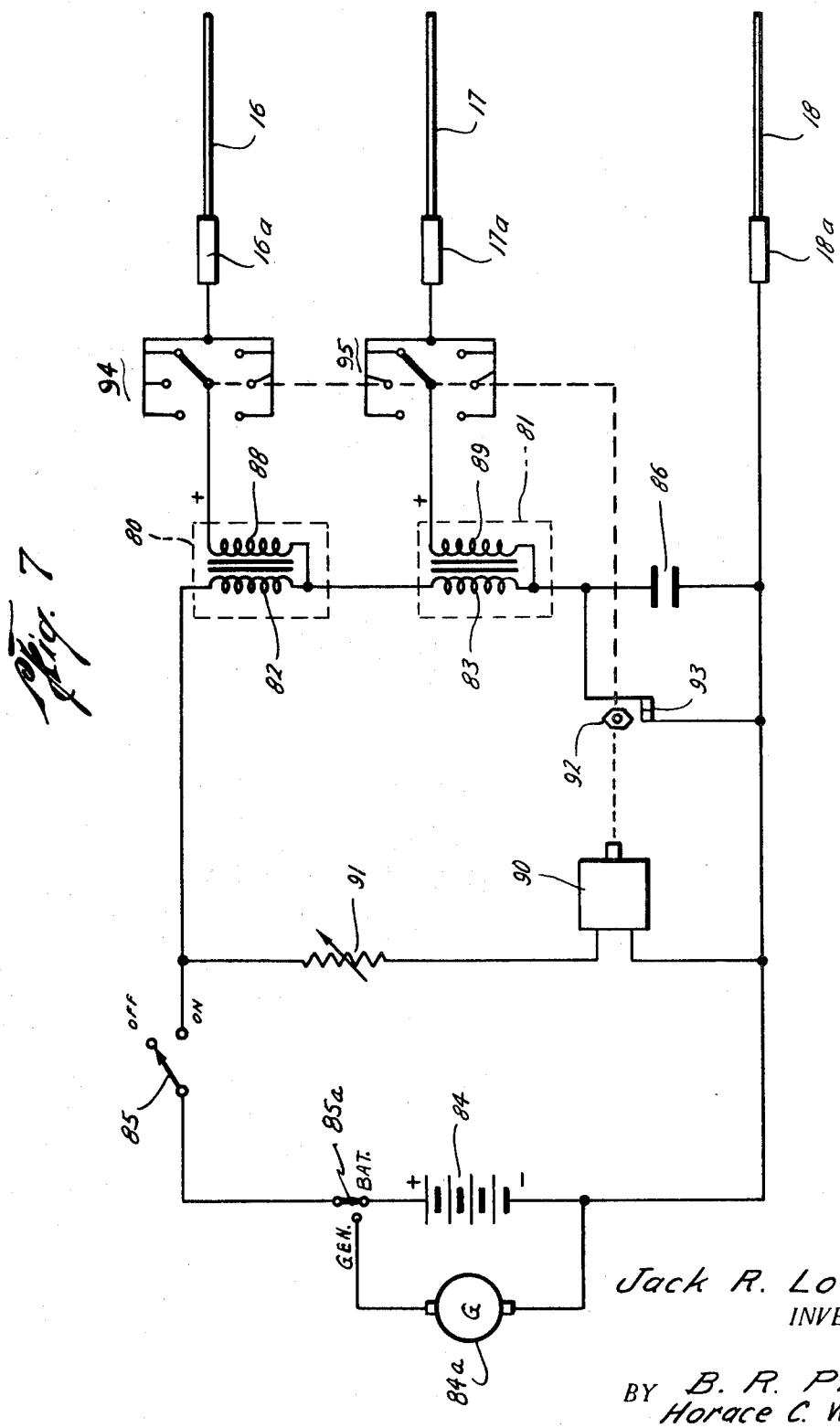

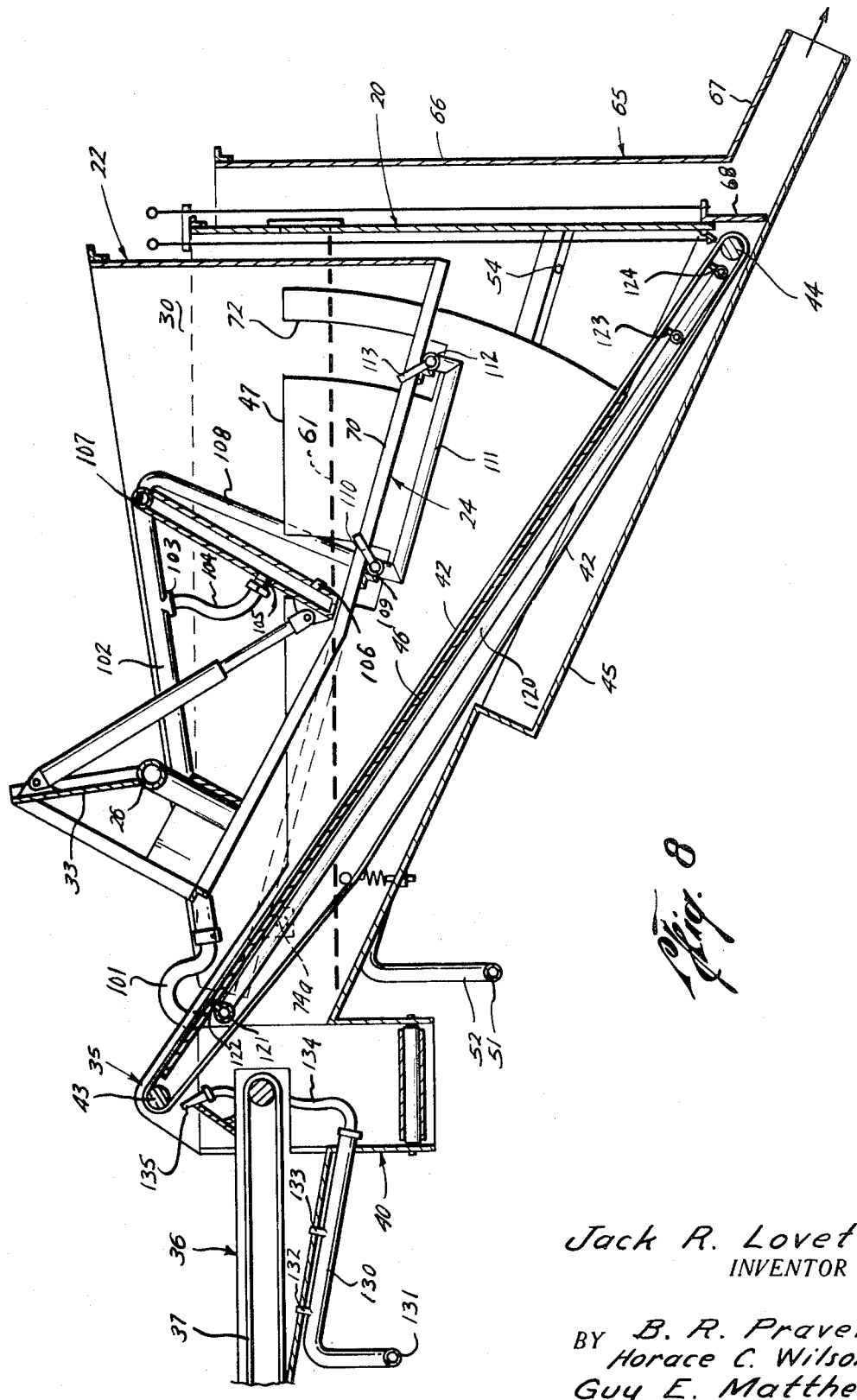

3,750,233

SHRIMP SEPARATING METHODS

BACKGROUND OF THE INVENTION

This invention relates to methods and apparatus for separating shrimp and other crustaceans from fish where both are caught in an intermingled manner. While not limited thereto, the invention is particularly useful on board a shrimp boat for performing the separating operation as the shrimp and fish are caught.

Commercial shrimp boats catch shrimp by spreading a net and pulling it through the water in the vicinity of the bottom. Needless to say, various fish are usually also caught in the net. When the net is full, it is hauled back to the surface and swung aboard the boat. The catch is dumped at a sorting station on board the boat. The shrimp and fish are then separated from one another in a manual manner. The shrimp are placed in a shrimp storage facility, while the fish are either thrown back into the sea or placed in a separate fish storage facility in the event that it is desired to use the fish for commercial purposes.

This manual separating of the shrimp and fish is cumbersome and time-consuming. Also, it usually requires the use of a larger number of people than is desired. Furthermore, when performed aboard a shrimp boat as the shrimp and fish are being caught, it is usually done in such haste that as many as 40 percent of the shrimp are lost through failure to separate them from the fish. It would be desirable, therefore, to provide a more rapid and efficient way of doing the separating.

SUMMARY OF THE INVENTION

It is an object of the invention, therefore, to provide a new and improved method of separating shrimp and other crustaceans from fish where both are caught in an intermingled manner.

It is another object of the invention to provide new and improved apparatus for use on a shrimp boat for enabling the separation of shrimp from fish in a more rapid and efficient manner.

In accordance with one feature of the invention, a method of separating shrimp and other crustaceans from fish where both are caught in an intermingled manner comprises subjecting an intermingled bunch of crustaceans and fish to an electric shock. The method also includes placing the shocked bunch in a container of water, whereupon the shocked crustaceans sink and the shocked fish float. The method further includes removing the crustaceans from the lower portion of the container.

In accordance with another feature of the invention, apparatus for use in separating shrimp and other crustaceans from fish where both are caught in an intermingled manner comprises container means for holding a supply of water and for receiving an intermingled bunch of crustaceans and fish. The apparatus also includes screening means located in the container means below the water level for allowing the crustaceans to fall through to a lower region of the container means. The apparatus further includes means for removing the crustaceans from the lower region of the container means.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIG. 3 is a cross-sectional view taken along section line 3—3 of FIG. 2;

FIG. 4 is a cross-sectional view taken along section line 4—4 of FIG. 2;

FIG. 5 is a cross-sectional view taken along section line 5—5 of FIG. 3;

FIG. 6 is a cross-sectional view taken along section line 6—6 of FIG. 3;

FIG. 7 is an electrical circuit diagram of an electrical shocking apparatus used with the FIG. 1 apparatus; and FIG. 8 is a cross-sectional view corresponding to FIG. 3 and showing the details of various auxiliary water spraying mechanisms.

DESCRIPTION OF THE PREFERRED EMBODIMENT

Figure 1:
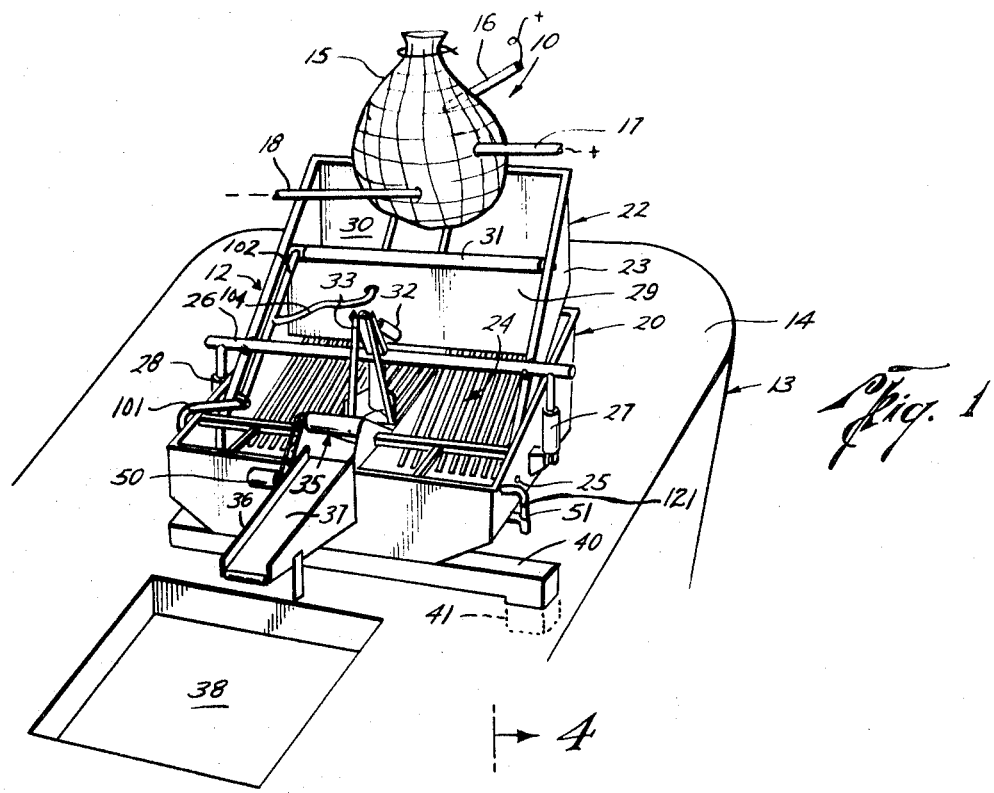
FIG. 1 shows a perspective view of a representative embodiment of shrimp separating apparatus constructed in accordance with the present invention and installed on the rear portion of a shrimp boat.

Referring to FIG. 1, there is shown a perspective view of a representative embodiment of the present invention. Such embodiment is particularly adapted for use on board a shrimp boat and will be described in that environment. It should be understood, however, that the present invention can also be used at a shore based location where such is desired. For sake of an example, the invention will be described for the case of shrimp, though it is to be understood that the invention is also applicable to other types of crustaceans, such as lobsters, crabs and crayfish.

As indicated in FIG. 1, the illustrated embodiment of the separating apparatus includes an electrical shocking apparatus, part of which is indicated at 10, and a sorting machine which is generally indicated at 12. The sorting machine 12 is mounted on the rear portion of a shrimp boat 13 with parts of the machine 12 being located below the deck 14 of the shrimp boat 13. A typical net load of intermingled shrimp and fish are indicated at 15. For simplicity of illustration, the hoisting mechanism and lines and tackle for pulling the net 15 out of the sea and swinging it aboard the boat 13 have been omitted. The electrical shocking apparatus 10 includes metal probes or electrodes 16, 17 and 18 which are inserted into the net load of shrimp and fish after it is swung aboard the boat 13. Probes 16 and 17 are connected to positive terminals of a high voltage source (shown in FIG. 7), while the probe 18 is connected to the negative terminal of such source. The electrical shock applied to the shrimp and fish is preferably of sufficient magnitude to electrocute substantially all of such shirmp and fish. After the shrimp and fish are thoroughly shocked, the high voltage is turned off and the probes 16, 17 and 18 are removed from the net 15.

The sorting machine 12 includes container means represented by a flotation tank 20 for holding a supply of water and for receiving the intermingled bunch of shrimp and fish which are dumped therein from the net 15 following the electrical shocking operation. Located within the flotation tank 20 is a tiltable fish removing mechanism 22. This fish removing mechanism 22 includes a three-sided vertically extending frame structure 23 having a screening tray 24 attached to the bottom thereof. The fish removing mechanism 22 is pivotally coupled to the flotation tank 20 at point 25. The machine 12 includes a controllable actuator mechanism for raising and lowering the rear portion of the fish removing mechanism 22 with respect to the pivot point 25. This actuator mechanism includes a lifting bar 26 which is connected to the side walls of the frame structure 23 and a pair of hydraulic rams 27 and 28 connected between the two ends of the lifting bar 26 and the two sides of the flotation tank 20. Rams 27 and 28 enable the raising and lowering of the lifting bar 26 and, hence, the rear portion of the fish removing mechanism 22. The fish removing mechanism 22 is shown in the raised position in FIG. 1.

The fish removing mechanism 22 further includes a transverse gate 29 which may be opened and closed and which, when closed, provides a shrimp and fish receiving compartment 30 into which the shrimp and fish in the net 15 are dumped. The top portion 31 of the gate 29 is pivotally pinned to the sides of the frame structure 23 and the lower portion of the gate 29 can be swung upward or downward by means of a hydraulic control cylinder 32 which is connected between the gate 29 and a support structure 33 mounted on the lifting bar 26.

A basic concept employed by the present invention is the fact that dead crustaceans, such as shrimp, will sink to the bottom, while dead fish will float to the surface of a body of water. Thus, when the fish removing mechanism 22 is in its lowered position such that it is mostly inside of the water-filled flotation tank 20 and the electrocuted shrimp and fish are dumped into the receiving compartment 30, the electrocuted shrimp fall through the screening tray 24 and into the lower region of the flotation tank 20. The shrimp are then removed from the lower portion of the flotation tank 20 by means of an inclined conveyor 35. Conveyor 35 dumps the shrimp onto a culling table 36. Culling table 36 is a horizontal table having a moving conveyor belt 37 for conveying the shrimp to a shrimp storage facility, such as the hold 38 of the boat 13. A human operator is stationed alongside of the culling table 36 for removing any remaining "trash" (small fish, sea creatures, plant life, etc.) which may have reached the conveyor 35.

The bigger fish are periodically removed from the flotation tank 20 by raising the fish removing mechanism 22 to its elevated position. At this point, the screening tray 24 is completely out of the water and the bigger fish slide down the inclined screening tray 24 and fall into a lateral conveyor mechanism 40 located below the forward end of the flotation tank 20. Such conveyor mechanism 40 may simply dump the fish over the side of the boat 13 or it may instead be used to convey the fish to a fish meal machine located on board the boat 13. In FIG. 1, the conveyor mechanism 40 is shown as dumping the fish into a chute 41 which runs to a fish meal machine located below the deck 14 of the boat 13.

The details of the sorting machine 12 are shown in FIGS. 2–6. Considering first the inclined conveyor 35 for removing the shrimp from the bottom of the flotation tank 20, such conveyor 35 is best seen in FIG. 3. As there indicated, conveyor 35 includes a continuous conveyor belt 42 which runs in a longitudinal direction between a pair of rollers 43 and 44. The lower conveyor roller 44 is located at the lowermost point in an inclined trough 45 which is secured to the bottom of the main body of the flotation tank 20. The top of the trough 45 is open as is the portion of the flotation tank 20 directly above the trough 45. The upper span of the conveyor belt 42 rides on an inclined support plate 46 (FIG. 3) which is secured between a pair of vertically extending baffle plates 47 and 48. An elevational view of the baffle plate 47 is shown in FIG. 3, while edge views of both baffle plates 47 and 48 are shown in FIGS. 5 and 6. The bottom edges of baffle plates 47 and 48 are secured to the bottom of the flotation tank 20. A tension roller 49 is provided for the lower span of conveyor belt 42, such roller 49 being coupled by way of tension springs 49a to the bottom of flotation tank 20. Among other things, the baffle plates 47 and 48 serve to prevent objects floating in the water in the tank 20 above the screening tray 24 (in its lowered position) from reaching the conveyor belt 42. The upper span of the conveyor belt 42 is continuously moved in the forwardly direction (toward roller 43) by means of an electric motor 50 (FIG. 1) mounted on the front end of the flotation tank 20 and coupled to the upper conveyor roller 43 by an appropriate drive belt.

The sorting machine 12 further includes water supply means for supplying a continuous flow of water to the flotation tank 20. This means includes a transverse water supply pipe 51 and a pair of longitudinal water supply pipes 52 and 53 which run alongside the two sides of the flotation tank 20. The pipe 52 is periodically connected to the interior of the flotation tank 20 by means of a series of smaller diameter water injection pipes 54 which, as indicated in FIG. 4, are spaced apart along the longitudinal portion of the pipe 52. Similarly, the longitudinal pipe 53 on the other side of the tank 20 is periodically connected to the interior of the tank 20 by smaller diameter water injection pipes 55 (FIGS. 5 and 6). Sea water is pumped into the transverse pipe 51 by means of an appropriate water pump (not shown) which is connected to one end thereof. This sea water is then ejected from the injection pipes 54 and 55 into the interior of the tank 20.

Longitudinally extending deflector plates 56 and 57 cooperate with the injection pipes 54 and 55, respectively, for deflecting the water downwardly along the inclined bottom panels 58 and 59 of the flotation tank 20. This flushes the shirmp into the rear portion of the trough 45 and, hence, onto the lower end of the upper span of the shrimp conveyor belt 42. Outlet 60 (FIG. 3) in the rear wall of the trough 45, when open, assists in maintaining the desired flow pattern for the flushing action. The water is, however, injected into the flotation tank 20 at a rate greater than that at which it can flow out of the ports 60. As a consequence, the flotation tank 20 also fills up with water to a water level indicated at 61. This water level is established by large rectangular water outlets 62 and 63 (FIG. 2) which are provided in the rear wall of the flotation tank 20 near the top thereof.

Figure 2:
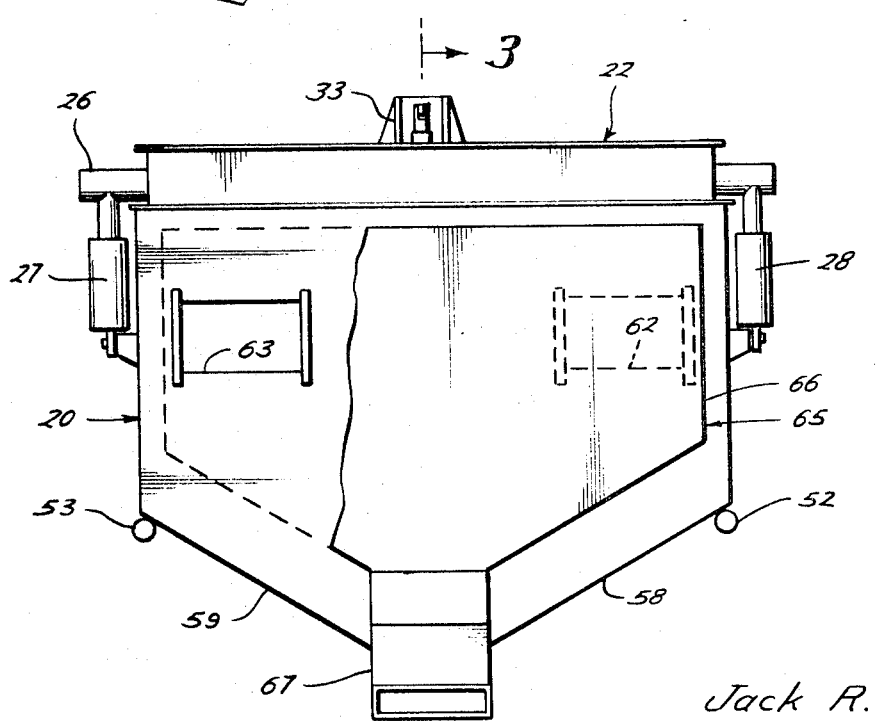
FIG. 2 is an elevational view of the back end of a portion of the shrimp separating apparatus of FIG. 1.

An exit chute structure 65 is attached to the rear wall of the flotation tank 20. As indicated in FIGS. 2 and 3, this exit chute structure includes a vertically extending portion 66 for catching the water overflowing from the outlets 62 and 63 and a lower exit chute 67 for dumping the overflow water back into the sea. Chute 67 extends out the back end of the shrimp boat 13. It also disposes of the water from the ports 60 at the back end of the trough 45.

The outlet 60 in the rear wall of trough 45 is provided with a movable gate 68 for enabling the opening and closing of the outlet 60. Gate 68 is a vertically movable rectangular plate provided with appropriate guide members (not shown) along the two sides thereof. Gate 68 is controlled by means of a lifting rod 68a which extends upwardly to a pull ring 68b located at the upper rear of the flotation tank 20. A movable screen member 69 of relatively small mesh size is pivotally mounted to the inner wall of the lower rear end of the flotation tank 20 just above the outlet 60, the pivotal connection being indicated at 69a. Screen member 69 is controlled by means of a lifting rod 69b which runs upwardly to a pull ring 69c located at the upper rear of the flotation tank 20. Initially, the gate 68 is in its lowermost position, as is the screening member 69, these being the positions shown in FIG. 3. With gate 68 down, outlet 60 is closed to enable a rapid initial fill up of the flotation tank 20 with water. When the tank 20 is filled to the desired level, the gate 68 is raised to open the outlet 60, thus allowing the desired water flow pattern for the separating operations. Screening member 69 is such that a minimum of clearance exists between such member and the conveyor belt 42. Screening member 69 prevents the loss of shrimp through the outlet 60. If, however, a substantial amount of shells and other debris should build up at the lower end of the conveyor belt 42, then the screening member 69 may be raised to allow such debris to pass out of the outlet 60.

Considering now the details of the removing or dumping mechanism 22 for the bigger fish, the screening tray 24 is comprised of grating bars in the form of a series of inverted longitudinally extending angle members 70 (FIGS. 5 and 6) which are attached in a spaced apart manner to periodic transverse angle members 71 (FIG. 3 and FIG. 4). The spacing between inverted angle members 70 is selected to enable the passage of the shrimp through the screening tray 24 and into the lower region of the flotation tank 20. It should also be noted that various other shapes can be used for the grating bars. For example, they can have a half-round cross-sectional shape. As indicated in FIG. 3, the forward portions of the angle members 70 which lie above the shrimp conveyor 35 are bent upwardly at an angle with respect to the remainder of the angle members 70. This allows clearance for the conveyor 35 when the screening tray 24 is in its raised position, such raised position being indicated in outline form in both FIGS. 3 and 4. As indicated in FIG. 3 for the baffle plate 47, baffle plates 47 and 48 are provided with downwardly extending slots 72 for receiving the transverse angle members 71 of the screening tray 24 when such screening tray is in its lowered position. The lower ends of the slots 72 serve as stops for limiting the downward movement of the screening tray 24 and hence for establishing its lowermost position.

As indicated in FIG. 5, the forward one of the transverse angle members 71 is split into two sections 71a and 71b lying on either side of the structure associated with the conveyor belt 42. These angle member sections 71a and 71b are welded to transverse shaft members 74a and 74b which are rotatably journaled in bearing blocks 75 which are secured to the side walls of the flotation tank 20 and the baffle plates 47 and 48.

The manner in which the bigger fish are dumped into the transverse conveyor mechanism 40 is best seen in FIG. 4. The solid line construction shows the dumping mechanism 22 in its lowered position. This is the position it is in when the net load of shrimp and fish are dumped into the receiving compartment 30. After the shrimp have had an opportunity to fall through the screening tray 24, the hydraulic rams 27 and 28 (FIG. 1) are energized to raise the rear portion of the dumping mechanism 22 to the elevated or fish dumping position indicated in outline form in FIG. 4. The hydraulic control cylinder 32 (FIG. 1) is then energized to open the gate 29. This enables the larger fish which are resting on the screening tray 24 to slide forward and onto a conveyor belt 77 of the transverse conveyor mechanism 40, from whence they are transported to the fish meal machine located below deck.

While the dumping mechanism 22 is in its elevated position, the smaller fish which remain in the flotation tank 20 floating at the surface of the water therein are removed from the flotation tank 20 by the flowing of the water out of the rear end water outlets 62 and 63 (FIG. 2). The rate of water flow into the flotation tank 20 is adjusted so as to provide for the overflow removal of substantially all of the smaller fish which are not caught and dumped by the screening tray 24.

Referring now to FIG. 7, there is shown the electrical circuit diagram for the electrical shocking apparatus 10 which is used with the sorting machine 12. The shocking apparatus 10 includes a pair of step-up transformers 80 and 81 having primary windings 82 and 83, respectively, which are connected in series with a battery 84 by way of an on-off switch 85, a selector switch 85a and a capacitor 86. Battery 84 may be, for example, the battery associated with the engine of the shrimp boat 13. A direct current generator 84a driven by the boat engine may instead be used as the primary voltage source by proper setting of the selector switch 85a. Transformers 80 and 81 are of the automotive ignition coil type. As such, they include high voltage secondary windings 88 and 89, respectively, each having a relatively large number of turns compared to their respective primary windings 82 and 83. The high voltage leads of the secondary windings 88 and 89 are connected to the fish shocking probes 16 and 17, respectively, by way of separate rotary distributor mechanisms 94 and 95. The high voltage leads are connected to the rotary arms, while all the stationary contacts of each distributor are connected to its respective probe. The third probe 18 is connected to the negative side of the system which may, if desired, be gounded. Probes 16, 17 and 18 are provided with insulated handles 16a, 17a and 18a, respectively. An electric motor 90 is connected in parallel with the battery 84 by way of a speed control rheostat 91 and the on-off switch 85. Motor 90 drives a cam 92 associated with a pair of breaker points 93 which are, in turn, connected across capacitor 86. Motor 90 also drives the rotary arms of distributors 94 and 95.

The operation of the shocking apparatus 10 is somewhat similar to the operation of the ignition system in an automobile. Such operation is commenced by setting switch 85 to the "on" position. With the breaker points 93 closed, current flows from the battery 84 (assuming switch 85a is in the battery position), through the primary windings 82 and 83 and back to the battery 84 by way of the closed breaker points 93. This produces a magnetic field about the windings of the transformers 80 and 81. When the breaker points 93 open, this primary current falls to zero at a very rapid rate. This causes a rapid collapse of the magnetic fields surrounding the coils of the transformers 80 and 81. This induces a very high secondary voltage across each of the secondary windings 88 and 89 of the transformers 80 and 81. These high voltages are applied by way of distributors 94 and 95 to the probes 16 and 17 for shocking the shrimp and fish. Since the cam 92 is being continuously rotated by the motor 90, the breaker points 93 are continuously opening and closing. Thus, the high voltages are supplied to the probes 16 and 17 in the form of rapidly reoccurring repetitive impulses or bursts.

Referring to FIG. 8, there are shown various auxiliary water sprayer mechanisms and water supply pipes which were omitted from FIG. 3 for sake of simplicity of explanation and illustration. As indicated in FIG. 8, the sorting machine 13 is provided with a water sprayer system for agitating and breaking up the shrimp and fish after they are dumped into the receiving compartment 30. This water sprayer system includes a flexible hose 101 connected between a water pump (not shown) and a water pipe 102 attached to the side wall of the fish dumping mechanism 22. A right angle coupling 103 connected to the pipe 102 is, in turn, connected to a flexible hose 104 running to a coupling 105 on the gate 29. As indicated in the drawings, the gate 29 is of a hollow construction for purposes of receiving and containing the water supplied thereto by the hose 104. A series of transversely spaced water ejection nozzles 106 are mounted on the back side of the hollow gate 29, these nozzles 106 being located one beside the other across the width of the gate 29. They eject the water from the interior of the gate 29 in a downwardly direction toward the screening tray 24 at an angle of approximately 45°.

The pipe 102 running along the side wall of the dumping mechanism 22 is also connected to a cross pipe 107 which also serves as the hinge shaft for the gate 29. Connected to this cross pipe 107 are a pair of downwardly extending pipes 108 (only one of which is visible in FIG. 8) which connect with a cross pipe 109 attached to the underside of the screening tray 24. This cross pipe 109 is provided with a series of transversely spaced upwardly projecting water ejection nozzles 110 which extend upwardly through various ones of the screening tray angle members 70. The cross pipe 109 is also connected by way of a further pipe 111 to a second cross pipe 112 which is also attached to the underside of the screening tray 24 near the rearward end thereof. Cross pipe 112 is provided with a series of transversely-spaced water ejection nozzles 113 which extend upwardly intermediate various ones of the screening tray angle members 70. The angles of nozzles 110 and 113 with respect to the screening tray 24 is approximately 45°. These nozzles 110 and 113, together with the nozzles 106 on the back side of the gate 29, serve to eject streams of water into the mass of shrimp and fish for enabling separation of same so that the shrimp are free to sink to the bottom of the flotation tank 20, while the fish are free to float to the surface of the water in such tank 20.

A second water sprayer mechanism is provided for spraying water against the underside of the upper span of the inclined shrimp conveyor belt 42. This water sprayer system includes an inclined water pipe 120 located between the upper and lower spans of the conveyor belt 42. The upper end of such pipe 120 is connected to a cross pipe 121 which is, in turn, connected to the water pump (not shown). The inclined pipe 120 is provided with a series of upwardly extending water ejection nozzles 122, 123 and 124, the forward one of which, namely, the nozzle 122, extends through the support plate 46 and serves to eject water against the underside of the upper span of the belt 42 near the forward end thereof. These nozzles 122, 123 and 124 cause the upper span of the conveyor belt 42 to ride on a layer of water. Among other things, this minimizes the accumulation of debris between the upper span of conveyor belt 42 and the support plate 46.

A further water sprayer mechanism is provided for the culling table 36. This mechanism includes a longitudinal water pipe 130 connected to a cross pipe 131 which, in turn, is connected to the water pump (not shown). Pipe 130 is provided with water ejection nozzles 132 and 133 which extend through the bottom plate of the culling table 36 for purposes of washing debris from the culling table and into the conveyor mechanism 40, from whence it is removed. A hose 134 is connected to the rearward end of the pipe 130 and runs to a water sprayer nozzle 135 mounted on the culling table 36 just below the upper shrimp conveyor roller 43. Water ejected from this nozzle 135 serves to insure that shrimp and any debris riding on the conveyor belt 42 are dislodged therefrom and onto the culling table 36 as the belt 42 comes around the conveyor roller 43.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of separating shrimp and other crustaceans from fish where both are caught in an intermingled manner comprising:
    subjecting an intermingled bunch of crustaceans and fish to an electric shock;
    placing the shocked bunch in a container of water, whereupon the shocked crustaceans sink and the shocked fish float;
    and removing the crustaceans from the lower portion of the container.

2. A method in accordance with claim 1 wherein the electric shock is of sufficient magnitude to electrocute at least the majority of the crustaceans and fish.

3. A method in accordance with claim 1 and further including removing the fish from the upper portion of the water in the container.

4. A method in accordance with claim 1 and further including:
    supplying a continuous flow of water to the container for floating the smaller fish out of an upper outlet of the container;
    and moving a screening mechanism through the water in the upper portion of the container for removing the larger fish from the container.

5. A method of separating shrimp and other crustaceans from fish where both are caught in an intermingled manner comprising:

catching a net load of intermingled crustaceans and fish;

inserting electrical probe means into the net load of crustaceans and fish;

applying an electric voltage to the probe means for subjecting the crustaceans and fish to an electric shock;

removing the probe means from the net;

dumping the catch of crustaceans and fish in a container of water, whereupon the shocked crustaceans sink and the shocked fish float;

and removing the crustaceans from the lower portion of the container.

6. The method of separating fish from shrimp and other nonfloating marine bodies in a catch which comprises the steps of confining the catch in a compact mass, subjecting the catch to an energy discharge of a character to immobilize the animal life in the catch, separating the floating bodies from the nonfloating bodies in the catch by means of a liquid bath, discharging the floating bodies from the surface of the bath into a first disposal means, and discharging the nonfloating bodies from an outlet at the bottom of the bath into a second disposal means.

7. The method of separating fish and other floating bodies from shrimp and other non-floating bodies which comprises the steps of confining the catch in a compact mass, killing the confined catch, separating the floating bodies from the non-floating bodies in the catch by means of a liquid bath, discharging the floating bodies from the surface of the bath into a first disposal means, and discharging the non-floating bodies into a second disposal means.

* * * * *